United States Patent [19]

Poirier

[11] Patent Number: 5,194,324
[45] Date of Patent: Mar. 16, 1993

[54] HIGH GLOSS LABEL FACE STOCK
[75] Inventor: Robert V. Poirier, Fairport, N.Y.
[73] Assignee: Mobil Oil Corporation, Fairfax, Va.
[21] Appl. No.: 808,787
[22] Filed: Dec. 16, 1991
[51] Int. Cl.$^5$ ............................. A61F 3/02; B32B 3/26
[52] U.S. Cl. .................................. 428/315.5; 428/40; 428/315.9; 428/317.3; 428/317.9; 428/323; 428/354
[58] Field of Search .................. 428/40, 315.5, 315.9, 428/317.3, 317.9, 323, 354

[56] References Cited

U.S. PATENT DOCUMENTS

| | | | |
|---|---|---|---|
| 3,697,367 | 9/1972 | Schwarz et al. | 428/398 |
| 3,795,720 | 3/1974 | Schwarz et al. | 264/41 |
| 4,118,438 | 9/1978 | Matsui et al. | 428/338 |
| 4,377,616 | 3/1983 | Ashcraft et al. | 428/213 |
| 4,582,736 | 4/1986 | Duncan | 428/40 |
| 4,632,869 | 12/1986 | Park et al. | 428/315.5 |
| 4,652,489 | 3/1987 | Crass et al. | 428/337 |
| 4,741,950 | 5/1988 | Liu et al. | 428/315.5 |
| 4,758,462 | 7/1988 | Park et al. | 428/213 |
| 4,965,123 | 10/1990 | Swan et al. | 428/315.9 |
| 5,091,236 | 2/1992 | Keller et al. | 428/315.5 |

Primary Examiner—William J. Van Balen
Attorney, Agent, or Firm—A. J. McKillop; C. J. Speciale; J. P. O'Sullivan, Sr.

[57] ABSTRACT

An opaque, biaxially oriented polymeric label stock structue, of:

(a) a thermoplastic polymer matrix core layer having a first surface and a second surface, within said core is located a strata of voids, positioned at least substantially within a substantial number of said voids is at least one spherical void-initiating particle which is phase distinct and incompatible with the matrix material, the void space occupied by the particle being substantially less than the volume of the void, with one generally cross-sectional dimension of the particle at least approximating a corresponding cross-sectional dimension of the void; the population of the voids in the core being such as to cause a significant degree of opacity;

(b) a first high gloss medium density polyethylene skin layer adhering to the first surface of the core layer;

(c) a second thermoplastic polymer skin layer adhering to the second surface of the core layer; and (d) an adhesive on the second surface of the thermoplastic skin layer.

10 Claims, No Drawings

HIGH GLOSS LABEL FACE STOCK

FIELD OF THE INVENTION

This invention relates to the field of adhesively applied labels. In particular the invention relates to biaxially oriented polymer film structures employed as adhesively applied labels.

BACKGROUND OF THE INVENTION

Of recent years polymeric films have been utilized to take the place of paper for product labels and the like. Synthetic film labels are stronger and in some respects easier to handle in automatic machinery employed for applying labels to products.

A typical system employs a release layer which carries a label removable therefrom. The label carried by the release substrate has a pressure sensitive adhesive on one side and product identifying indicia or other information on the other. The release layer is composed of a substrate which has a surface to which the label adhesive will not aggressively adhere. The release characteristics of the substrate and the adhesive are such that when the substrate is bent through a certain angle, the stiffness of the label will cause it to separate from the release surface in spite of the presence of the adhesive. This will permit a container or product to be interfaced with the adhesive layer so that the label will transfer from the release surface to the product to be labeled. This technique happens rapidly and sequentially in automated mechanism. One shortcoming in general with the use of polymeric films for label stock is that they cannot esthetically compete with opaque gloss coated paper for pressure sensitive or activatable adhesive-label face stock applications. Therefore, it is an object of the present invention to present a synthetic film-adhesive label face stock having high gloss and thus the ability to esthetically compete with coated paper stock for label purposes.

SUMMARY OF THE INVENTION

The opaque label stock of the present invention includes the following multilayer structures:

(a) an oriented thermoplastic polymer matrix core layer having a first surface and a second surface. Within the matrix is located a strata of voids and positioned at least substantially within a substantial number of said voids is at least one spherical void-initiating particle which is phase distinct and incompatible with said matrix material. The void space occupied by said particle being substantially less than the volume of said void, with one generally cross-sectional dimension of said particle at least approximating a corresponding cross-sectional dimension of said void; the population of said voids in said core being such as to cause a significant degree of opacity;

(b) a first high gloss medium density polyethylene skin layer adhering to said first surface of said core layer;

(c) a second thermoplastic polymer skin layer adhering to said second surface of said core layer; and (d) an adhesive on the surface of said thermoplastic skin layer.

In many instances the adhesive will be a pressure sensitive adhesive. In other cases the adhesive may be one activatable by any means, such as, heat, solvent, etc. For its best utility the above described label structure is carried by a release surface wherein the release characteristics of the surface of the release sheet permits the label stock to be readily removed therefrom so as to be applied to some other surface.

DETAILED DESCRIPTION OF THE INVENTION

For use as a base or core layer for label stock purposes this material must be opaque, preferably white opaque, in order to provide an excellent contrasting background for printed material applied to the label stock. A material which has the good characteristics of excellent tensile strength, low permeability to moisture and other liquids is a polypropylene core material cavitated in a special way so as to produce a pearlescent opaque appearance. A material of this type is described in U.S. Pat. No. 4,377,616 issued to Ashcraft et al. This patent is incorporated herein in its entirety. In accordance with this patent the process of preparing the opaque film structure is as follows: a major proportion of a first thermoplastic polymeric material, e.g. polypropylene, is mixed with a minor proportion of a second material of a higher melting point or of a high glass transition temperature than the first material. This mixture is heated to a temperature at least above the melting point of the first material. Thereafter the second material is uniformly dispersed throughout the molten first material in the form of microspheres. The microspheres can be conveniently prepared in a master batch of, e.g. polybutylene terephthalate, microdispersed in molten form in molten polypropylene. This combination is then coextruded so as to have a thin skin layer on opposite surfaces of the core combination of materials. Thereafter this arrangement is biaxially oriented at a temperature and to a degree to form a strata of opacifying closed cell voids of dimensions X, Y and Z. Dimensions X and Y are major dimensions and dimension Z is a minor dimension at least generally corresponding to the diameter of the microspheres. In some cases the skin films are substantially void-free in others there are advantages including certain inorganic void initiated particles, particularly in the skin closest to the adhesive. The material dispersed as microspheres throughout the molten core material can be polybutylene terephthalate, nylon, solid or hollow preformed glass spheres, metal beads or spheres, ceramic spheres, calcium carbonate, etc.

As indicated the preferred core material is polypropylene, particularly preferred is an isotactic polypropylene containing at least about 80% by weight of isotactic polypropylene. It is also preferred that the polypropylene have a melt flow index of from about 2-10g/10 minutes.

It is preferred that the average diameter of the void-initiating particles be from about 0.1 to about 10 microns. These particles may be of any desired smooth shape, although it is preferred that they be substantially spherical.

The skin material coextruded onto one surface of the core to be cavitated is a medium density polyethylene. By this is meant that the density of the polyethylene can be anywhere from about 0.926–0.945. Such a medium density polyethylene when formed into one of the skins of the label stock structure will have a 45° gloss of 50 or greater. This gloss characteristic is at least as good as or better than commercially available coated paper label stock. It is to be understood that both sides of the cavitated core material may be extrusion coated with medium density polyethylene. It is also contemplated that one side may carry the medium density polyethylene layer while the opposite surface may carry no skin layer or may have any one of a variety of other skin surfaces. For example, the opposite skin material can be non-cavitated polypropylene, a copolymer of ethylene and propylene, where the proportion of ethylene is from 2-8%, a terpolymer of ethylene, propylene, butene-1, etc. This skin surface can be any material which will aggressively receive thereon a coating of a pressure sensitive adhesive. This aggression must be sufficient to remain in contact with the skin layer when separation occurs between the adhesive and a release surface carrying the same. The second skin layer may include an inorganic material such as calcium carbonate to provide for improved label cutting.

In the art of labeling, the label which is to be applied to a surface or a product is normally carried by a release sheet or surface. A common example of this type of label structure familiar to most automobile owners is the county or city registration sticker which must be applied to a windshield. This type of structure comprises a release sheet, one side of which has a release surface of a silicone material or the like. Carried on this surface is a pressure sensitive adhesive and applied to the pressure adhesive is the label or decal to be applied to a windshield. Of course the adhesive may first be applied to the label before mating with the release liner. When the decal or label is separated from the release sheet the pressure sensitive adhesive preferentially adheres to the label or decal and by this means is affixed to the windshield of the car. For the labeling of cans or bottles obviously a more automated system must be employed. In providing for a more or less continuous labeling system, a continuous release roll is prepared by applying to one side of a continuous substrate, which may be paper or polymeric film, and which may be of a single or multiple layers, a release coating of silicone or the like. Thereafter, for example, the release face of the release linear is coated with a layer of pressure sensitive adhesive. Thereafter, a label stock as described above which has been or will be printed with the appropriate label indicia, is brought into mating contact with the pressure sensitive adhesive. Following this mating, printing can be accomplished if not already completed and individual labels can be die-cut severed in a manner well known to the art. Following this procedure labels then can be sequentially individually applied to a product surface by causing the individual labels to separate from the release surface and having the adhesive side of the label contact the product to be labeled.

As indicated above, instead of a pressure sensitive adhesive, activatable adhesives can be employed for certain labeling techniques. For instance, when a label is to be applied about the full circumference of a package or bottle a water or other solvent can activate an adhesive stripe or strip applied to one end of the label. The label is then fixed in place by a slight overlap of the other end of the label.

It has also be discovered that die cutting of labels is materially enhanced by including in organic particles, such as calcium carbonate in the label skin layer close to the adhesive and release layer. These particles also cause some cavitation. The following illustrates the beneficial distinctions between employing a medium density polyethylene as the label surface in comparison with high density polyethylene or coated paper label stock for the same purpose.

EXAMPLE

Three resin formulations are melted and coextruded through a sheet die to form a three layer 80 mil sheet:
LAYER A: 92% Medium Density Polyethylene (MDPE)+8% $TiO_2$
LAYER B: 94% Polypropylene homopolymer+6% polybutylene terephthalate
LAYER C: 85% Polypropylene homopolymer +15% $CaCO_3$ The sheet is quenched, reheated and stretched 4-6 times in the machine direction at a temperature between the $T_g$ and the melt temperature of the polypropylene homopolymer. Subsequently, the machine direction stretched sheet is stretched 8-10 times the transverse direction at a temperature between the $T_g$ and the melt temperature of the polypropylene homopolymer to produce a finished, cavitated core film between 2.6 and 3.0 mils thick. Both sides of the film are corona discharge treated to 38 dynes/cm or greater prior to winding in mill roll form. This technique is repeated employing different medium density polyethylenes and a high density polyethylene as shown in the following results. The label stock employing medium density polyethylene having a density of 0.941 and a melt index of 4 has a 45° gloss value of 57. The label stock employing the medium density polyethylene of 0.937 density and a melt index of 2.5, has a 45° gloss reading of 56. The label stock employing a high density polyethylene having a density of 0.960 and a melt index of 3 has a 45° gloss reading of 44. The gloss readings of the medium density polyethylene label stock compared favorably or better than commercially available coated paper label stock and, as shown, are clearly superior to high density polyethylene. The coated paper compared was a clay coated calendered paper identified as Kromekote from Champion International Co. This had a 45° gloss of 30.

The label stock of the present invention constitutes an excellent surface for water-based flexographic, UV/letterpress, and solvent-based UV-cure screen printing inks.

It should be evident that this disclosure is by way of example and that various changes may be made by adding, modifying or eliminating details without departing from the fair scope of the teaching contained in this disclosure. The invention is, therefore, not limited to particular details of this disclosure except to the extent that the following claims are necessarily so limited.

What is claimed is:

1. An opaque, biaxially oriented polymeric label stock structure, comprising:
   (a) a thermoplastic polymer matrix core layer having a first surface and a second surface, within said core is located a strata of voids; positioned at least substantially within a substantial number of said voids is at least one spherical void-initiating particle which is phase distinct and incompatible with said matrix material, the void space occupied by said particle being substantially less than the volume of said void, with one generally cross-sectional dimension of said particle at least approximating a corresponding cross-sectional dimension of said void; the population of said voids in said core being such as to cause a significant degree of opacity;

(b) a first high gloss medium density polyethylene skin layer adhering to said first surface of said core layer;

(c) a second thermoplastic polymer skin layer adhering to said second surface of said core layer; and (d) an adhesive on the second surface of said thermoplastic skin layer.

2. The film of claim 1 wherein said adhesive is pressure-sensitive adhesive.

3. The film of claim 1 wherein said adhesive is an activatable adhesive.

4. The film of claim 1 wherein both skin layers are high gloss medium density polyethylene.

5. The film of claim 4 wherein said first polyethylene layer includes opacifying titanium dioxide therein.

6. The film of claim 1 wherein the matrix core layer and said second skin layer are of isotatic polypropylene.

7. The film of claim 6 wherein said void initiating particles comprise polybutylene terephthalate.

8. The film of claim 7 wherein said second skin layer includes an inorganic cavitating agent.

9. The film of claim 8 wherein said agent is calcium carbonate.

10. The film of claim 4 wherein said polyethylene has a density of from about 0.926 to about 0.945.

* * * * *